June 15, 1965     L. GUSEWITCH ETAL     3,189,914
FLUORESCENT CONTACT LENS AND METHOD OF LOCATING SAME
Filed July 31, 1961
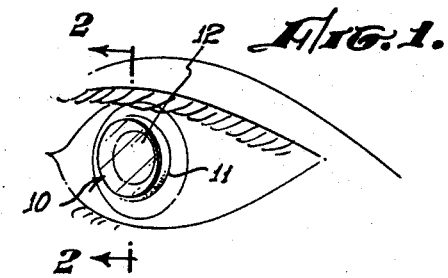
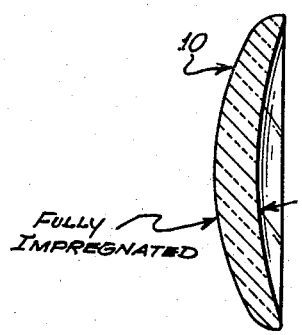
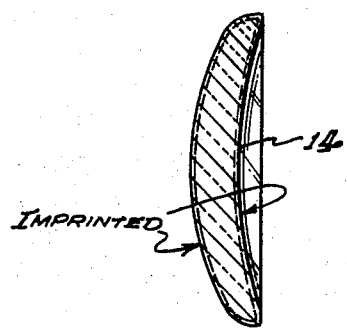
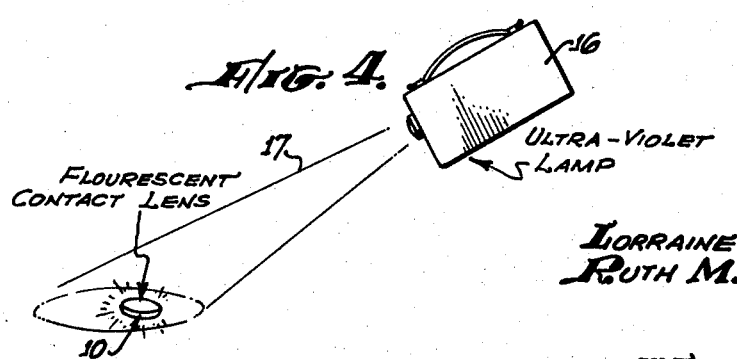
LORRAINE GUSEWITCH,
RUTH M. CHEVALIER,
INVENTORS.
BY THEIR ATTORNEYS.
Spensley & Horn

United States Patent Office 3,189,914
Patented June 15, 1965

3,189,914
FLUORESCENT CONTACT LENS AND METHOD OF LOCATING SAME
Lorraine Gusewitch, Los Angeles, and Ruth M. Chevalier, Hollywood, Calif., assignors of fifteen percent to Berry D. Locke, Los Angeles, Calif.
Filed July 31, 1961, Ser. No. 127,992
4 Claims. (Cl. 351—160)

This invention relates to contact lenses adapted to be applied to the human eye, and more particularly to an improvement in such contact lenses which makes possible their detection when not in the eye.

Contact lenses have been under development for a considerable number of years and many improvements in such lenses have recently resulted. Earlier lenses covered substantially the entire front surface of the eyeball including the cornea and sclera with the pressure of the lens being borne by the sclera. More recent contact lens development has been toward corneal contact lenses which are large enough to cover only the cornea leaving the sclera substantially uncovered.

Contact lenses are, in general terms, a concavo-convex section of any suitable transparent or semi-transparent material. The material from which the lens is formed may be optical glass or as is more generally prevalent in the present state of the art, the material may be a synthetic resin plastic such as acrylic plastics and particularly methyl methacrylate. The material in the most general situation is preferably transparent, but in some instances, for cosmetic effects, or for the reduction of glare, the material may be slightly darkened or tinted.

The present invention is applicable to all types of contact lenses whether of the type which covers a portion or substantially all of the sclera or the now more prevalent corneal contact type. The present invention is, however, particularly adaptable to corneal contact lenses and is particularly advantageous in connection with such lenses due to their smaller size. Accordingly, the present invention will be described in connection with such corneal lenses.

Corneal lenses, of course, vary in size and shape to conform to the particular eye to which it is fitted. The maximum dimension, such as the diameter of the lens is less than the corresponding dimension of the iris so that the margins of the lens when in the normal position, are within the iris of the eye. The lens is not so small, however, that it will not completely cover the pupil when the pupil is in its fully opened position. The lens may, therefore be defined as to size as being within the limits of the eye but beyond the maximum opening of the iris. Optical correction of the lens may be ground either on the interior or exterior surface of the lens or both, and dependent upon the amount and type of correction to be applied to the eye, the lens may be relatively thick or thin and may vary in thickness over its cross-section. As a result, it can be seen that the contact lens is a relativly small piece of transparent material.

When the lens is being inserted into or removed from the eye it is easy to drop the lens from the inserting means used for placing it into or removing it from the eye. When dropped it can be seen that the contact lens being of small size and of transparent material, is very difficult to locate. This is particularly true when it is considered that the person who has dropped and misplaced the lens is probably searching for the lens with deficient eyesight. The problem of locating a fallen or misplaced contact lens is well known to users of lenses and is a considerable nuisance and problem.

It is a primary object of the present invention therefore to provide an improved contact lens which can be readily detected when it is misplaced or has fallen from the grasp of the user or from its position in the eye.

It is another object of the present invention to provide an improved contact lens which, when lost, misplaced or dropped, can be readily detected and located by one with deficient eyesight.

A further object of the present invention is to provide such a lens which can be made to fluoresce when its position or location is not known.

Yet another object of the present invention is to provide an improved means of manufacturing contact lenses which lenses are capable of being fluoresced by a light source of particular wave length, but which lenses do not have any appreciable fluorescent qualities under normal sunlight or under normal artificial light which may be encountered.

Yet another object of the present invention is to provide an improved contact lens which embodies a permanent method and means for detection, but which, under normal circumstances of use, is not changed in optical properties nor appearance.

A still further object of the present invention is to provide an improved contact lens embodying a means for detecting the same, together with a light source for such detection.

A further object of the present invention is to provide an improved method and means for fitting contact lenses which embody the present invention.

The present invention comprises a contact lens having embodied therein a material which, when exposed to light within the harmless ultra-violet range, fluoresces. There is also encompassed within the present invention a method and means for exposing such a lens to light to cause fluorescence and a material for fitting such lenses to the eye under ultra-violet light for detecting irregularities in grinding and fitting of the lens to the eye.

The novel features which are believed to be characteristic of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is an illustrative view in perspective of a contact lens as fitted to the eye;

FIGURE 2 is a view in cross-section of an illustrative contact lens in accordance with the present invention;

FIGURE 3 is a view similar to FIGURE 2 to illustrate an alternative embodiment of the present invention; and FIGURE 4 is a schematic view of the contact lens in accordance with the present invention with a light source for detecting the location of the lens.

As described hereinbefore, the size of contact lenses is very small, and this coupled with the fact that such lenses are transparent and most generally of optically clear material, makes them difficult to find or locate when they are dropped or misplaced. As previously mentioned, the most common way of losing such lenses is by dropping them during the insertion into the eye or removal from the eye. Obviously, when dropped it is difficult for one who must have such glasses for full vision to be able to locate such an object which is so difficult to see with full vision. Additionally, it should be noted that the problem of searching for a contact lens when it has been dropped or misplaced is compounded by the fact that in searching for a lens on the floor, it is a source of concern that before locating it it may be stepped on and broken or damaged.

The present invention obviates such difficulties by embodying in, or on, the lens itself a material which is a fluorescent dyestuff. The fluorescent material is such that it does not disturb the optical properties of the lens and is not substantially visible except under a particular light source, which source generates light in a range which is not encountered under ordinary circumstances of use of the lens. That is, more specifically referring to the figures, in FIGURE 1 the illustrative contact lens is shown in position on the eye to illustrate the overall size of the lens. The lens is thus somewhat smaller in diameter than the diameter of the iris 11 of the eye, but is greater in diameter than the pupil 12 of the eye when the pupil is in its fully opened position. The lens is of concavo-convex section and for purposes of illustration, has an interior radius of curvature which is predetermined relative to the radius of curvature of the eye. For example, if the radius of curvature of the cornea measures 7.8 mil, the radius of curvature of the concave side of the lens is of the order of 7.9 to 8.0 mil. Any suitable transparent or semi-transparent material my be used to form the lens. The material may be optical glass, or as is more common in present practice, it may be a synthetic resin plastic such as methyl methacrylate. The material as discussed before is usually perfectly transparent, but in some instances may be slightly darkened or tinted for glare reducing purposes or to achieve a cosmetic effect. In accordance with the present invention there is introduced into contact lenses of the conventional type as shown in the figures of the drawing, a fluorescent dyestuff. As an illustrative example, methyl methacrylate is utilized to form the contact lens 10 and there is dispersed throughout the methyl methacrylate, during the stage at which it is being formed into a lens blank, a predetermined quantity of fluorescent dyestuff, which in the presently preferred embodiment, is a derivative of 4-aminonapthalimide. This material, when dispersed throughout the resin plastic forming the dye blank, does not interfere with or alter the optical properties of the material. The presence of the dyestuff in the lens blank does not, in any way, alter or effect the grinding properties of the material and does not interfere, in any way, with the formation of the finished contact lens. The 4-aminonapthalimide, when dispersed throughout the resin plastic forming the contact lens, is not visible under normal sunlight nor under any normally encountered artificial light. The material is also not harmful to the eye nor to human tissue in any way. In its raw form the 4-aminonapthalimide derivative is a powder which is a fluorescing dyestuff. When subjected to any ultra-violet light in the 3660 A. unit range the material fluoresces and is readily visible. Thus, when subjected to the harmless ultraviolet light the material will fluoresce within the contact lens and as such will make the lens readily visible.

Although various fluorescent dyestuffs having the general properties described above may be used, the derivative of 4-aminopathalimide has been found to be particularly effective. Further, it may be readily seen that various methods may be employed to embody the fluorescent dyestuff in the lens so long as in doing so the optical properties of the lens are not altered. In its presently preferred form, the material is introduced into the lens by dispersing it into the resing plastic when the resin plastic is in a liquid stage. In the present embodiment methyl methacrylate is used as the resin plastic material for forming the lens and the methyl methacrylate is formed into lens blanks by transposing the resin from a liquid monomer to a solid polymer by means well known to the art. For example, by catalyzing the resin with 0.1% of benzoyl peroxide which is a non-participating catalyst, the material is caused to go from the liquid monomer stage to the solid polymer stage at predetermined temperatures, as for example, at 110° to 120° F. in a water bath. The methods of forming resin plastics into lens blanks for contact lenses is well known to the art and forms no part of the present invention except that in its presently preferred form of manufacture the improved lens of the present invention is formed by introducing the 4-aminonapthalimide derivative in powder form into the transparent resin material at the liquid stage prior to the time at which the liquid monomer is formed into a solid polymer. In its presently preferred form, approximately 0.1% dyestuff concentration is introduced into the lens blank material at the liquid stage. This is accomplished by dissolving one percent (1%) by volume of the dyestuff in the acrylic monomer as a working solution after which the working solution in the required amount is added to the slurry from which the lens blanks are formed. The amount of working solution of the dyestuff and acrylic is varied to form approximately 0.1% dye concentration in the final solid polymer rod from which several lens blanks are made. That is, up to sixty drops of the working solution are introduced into the slurry from which a solid polymer rod 3/4 inch in diameter and 1 1/2 inches tall is formed. The optimum concentration of dyestuff in the resin material will be dependent upon the particular dyestuff used as well as the particular transparent or semi-transparent material which is used. The optimum quantities can be readily determined by routine experiment of one skilled in the art. As stated hereinabove, in the presently preferred embodiment approximately 0.1% of dye concentration is utilized.

In addition to dispersing the dyestuff throughout the lens material, it is possible to embody the dyestuff in the lens in other manners. For example, in FIGURE 3 there is shown a contact lens having a film of such material at the surfaces 14 thereof. Although not visible as a distinguishable line, it is shown as such in the figure for purposes of illustration. Thus, in lenses which have already been formed and which are presently in use, it is possible to introduce the fluorescent material by various methods known to the art such as, for example, by tumbling to drive or burnish in the material in which case the material would be driven into all of the exterior surfaces of the lens to a sufficient depth to provide the required quantity of the fluorescent dyestuff. Other methods are possible for embodying the fluorescent material in the contact lens such as electrofluorescence. Additionally, the fluorescent material can be deposited, embedded, penetrated and so forth on only a portion of the lens. For example, a spot of the material can be incorporated into or upon the lens surface or the edge can be employed to carry the material.

Referring now to FIGURE 4, the utility in operation of the present invention is illustrated schematically wherein a portable source of ultra-violet light 16 is shown with the ultra-violet beam 17 directed to the lens 10 which is upon a surface such as a floor. When the ultra-violet light in the 3660 A. range strikes the lens of the present invention containing the fluorescent dyestuff, the lens becomes immediately visible due to its fluorescence. The lens fluoresces, however, only in the presence of the ultra-violet light. Thus, when a lens in accordance with the present invention has been dropped, as for example, during insertion into or removal from the eye, it is very difficult to see when on the floor, particularly due to its transparency. The wearer of the lens then takes the ultra-violet light source which is small, compact and light in weight. By turning on the light source and directing the beam over the various areas on the floor and particularly in front of the feet before stepping into an area, the contact lens can be readily found since, when the light beam 17 of ultra-violet light strikes the lens it fluoresces to such an extent that it is visible from a considerable distance. The ultra-violet light source is, in the illustrated embodiment, one of the battery operated types which are commercially available and which produce a directed beam of ultra-violet light in the 3660 A. unit range.

An additional aspect of the present invention should be noted in that it has been common in the prior art to employ a fluorescing liquid when fitting contact lenses in accordance with the prior art. That is, in order to make visible the areas of contact between the eye and the lens and to detect various pockets or points of contact between the eye and the lens where such contact is not desired, it is the practice to inject between the lens and the eye a material such as fluorisciene. By then subjecting the eye to ultra-violet light, it is possible to detect the location of the fluid and to note the fluid flow and fluid position to obtain a proper fit and proper correction of the lens. In connection with the present invention the use of materials heretofore known to the art would not be effective in that the fluorescence of the contact lens itself under the ultra-violet light used in fitting a lens will cancel out the fluorescence of the fitting material. There has therefore been developed in connection with the present invention an improved fitting material which when employed by the optometrist fitting the lens under ultra-violet will give sufficient contrast or a difference in color of fluorescence between the lens itself and the fitting material as to allow the proper fitting operation. In accordance with the present invention, a material is utilized which is powdered in form and comprises a resin carrier of the melamine-sulfonamid formaldehyde resin type which encompasses dye types such as rhodiamine, fluorisciene and lumogen. This material in powdered form can be mixed with various materials available to the optometrist such as liquids or pastes of the proper viscosity. These materials then when placed between the eye and the contact lenses and subjected to ultra-violet light of the type used in the fitting operation will cause a fluorescence in the fluid which is of greater intensity or which is different in color from the fluorescence caused by the lens itself so that the fitting operation can be carried out in the manner well known to the art.

Thus, there has been described an improved contact lens which incorporates a fluorescing dyestuff material, which material does not alter the optical properties of the lens material and which is invisible under ordinary circumstances. When subjected to ultra-violet light, however, it fluoresces with sufficient intensity as to be readily visible so that it can be located when lost, misplaced, or dropped. There has further been provided an improved material for fitting contact lenses in accordance with the present invention by using techniques and materials presently known to and available to those skilled in the art.

What is claimed is:

1. The method of locating a contact lens which is out of a human eye and which lens emits visible radiation when subjected to selected invisible light comprising scanning the general location of said lens with such selected invisible light and visibly detecting the lens by the visible light emitted therefrom.

2. The method of claim 1 wherein said selected invisible light is ultra-violet light.

3. A contact lens comprising a light refracting element having a first optically curved surface and a second concave surface of a size to fit the human eye, said element having 4-aminonaphthalimide thereon, whereby said lens may be located when out of a human eye by scanning with ultra-violet light.

4. A contact lens comprising a light refracting element having a first optically curved surface and a second concave surface of a size to fit the human eye, said element having 4-aminonaphthalimide therein, whereby said lens may be located when out of a human eye by scanning with ultra-violet light.

References Cited by the Examiner
UNITED STATES PATENTS

| | | | |
|---|---|---|---|
| 2,133,498 | 10/38 | Dittmer | 88—54.5 |
| 2,241,415 | 5/41 | Moulton | 88—54.5 |
| 2,250,521 | 7/41 | Boeder | 88—20 |
| 2,415,373 | 2/47 | Scalera et al. | |
| 2,510,438 | 6/50 | Tuohy | 88—54.5 |
| 2,929,931 | 3/60 | Richter et al. | 250—77 X |
| 2,938,873 | 5/60 | Kazenas | 252—301.2 |

OTHER REFERENCES

Archives of Ophthalmology, June 1937, vol. 17, page 1116 only.

Green: "Preliminary Report on a New Bifocal Contact Lens," in Contacto, vol. 5, No. 3, March 1961, pages 83–84.

JEWELL H. PEDERSEN, *Primary Examiner.*

EMIL G. ANDERSON, *Examiner.*